April 20, 1937. H. HARRISON 2,077,690
DISPLAY DEVICE
Filed Dec. 4, 1934 2 Sheets-Sheet 1
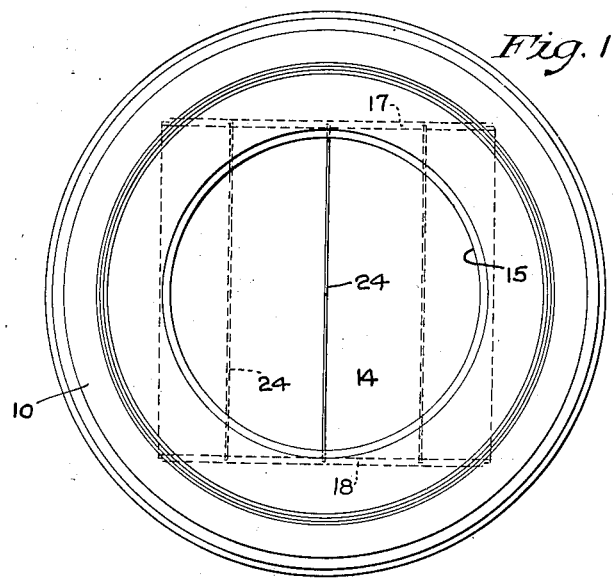
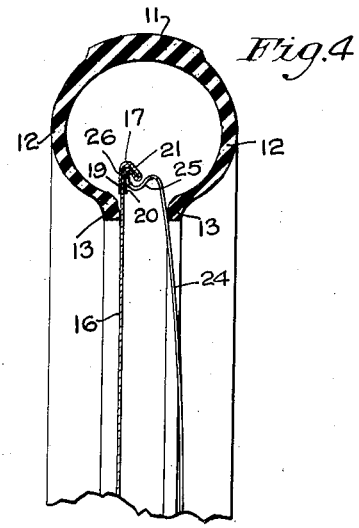
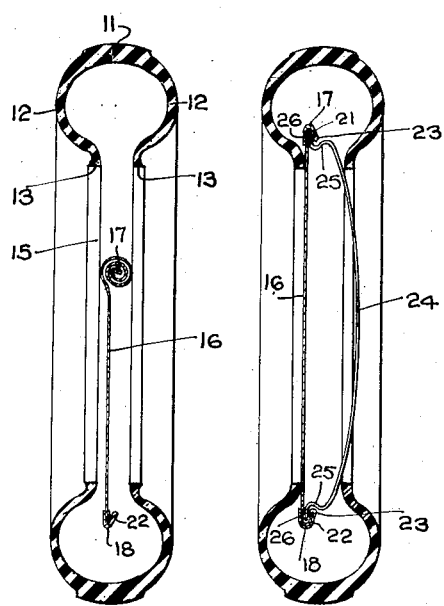
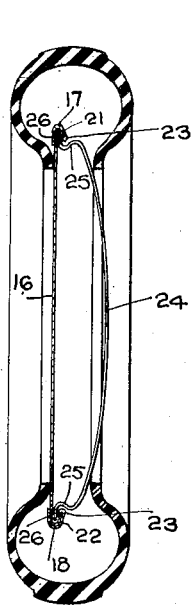
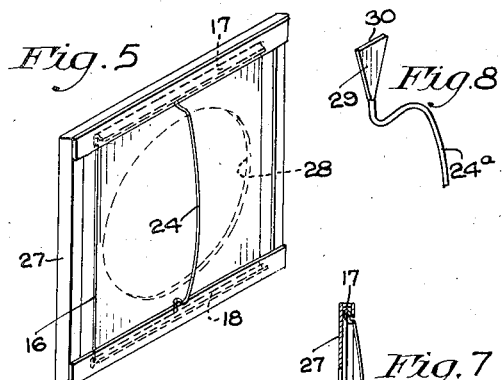
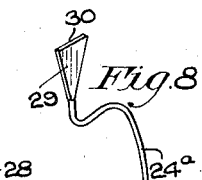
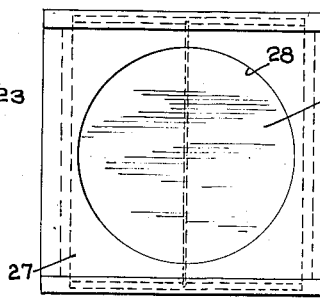
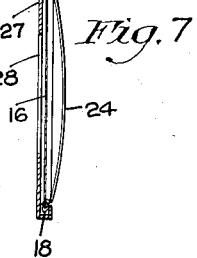
Inventor
HENRY HARRISON
By
Attorney.

April 20, 1937.  H. HARRISON  2,077,690
DISPLAY DEVICE
Filed Dec. 4, 1934   2 Sheets-Sheet 2
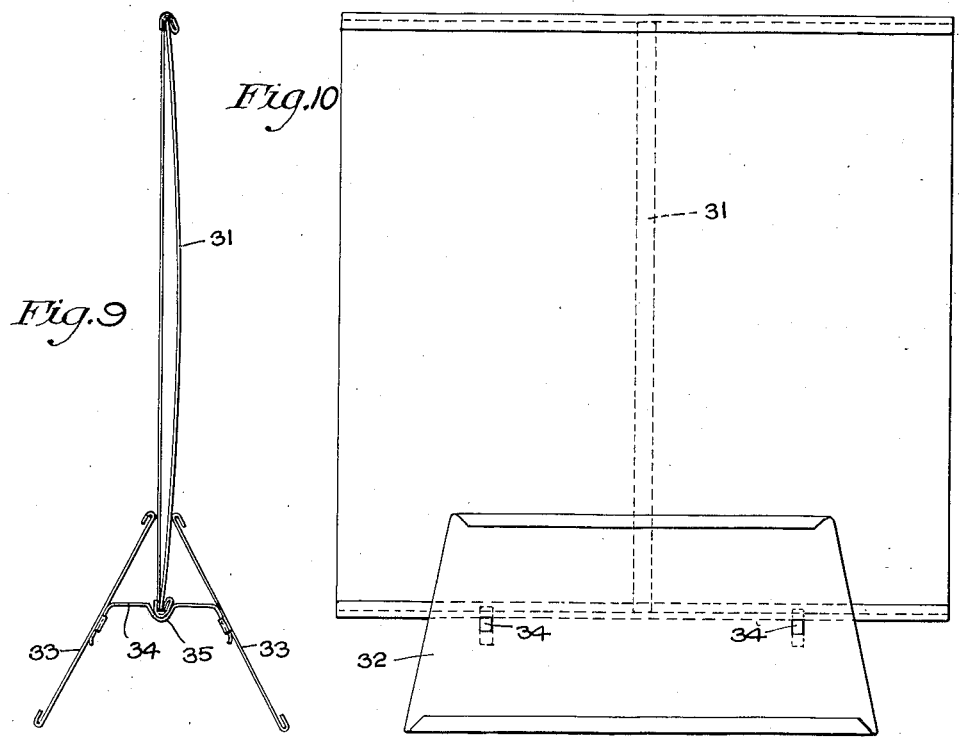
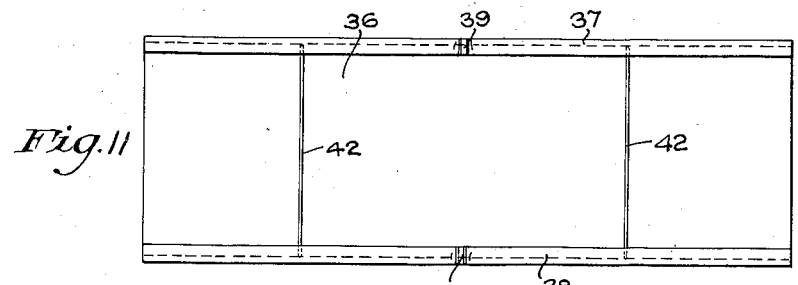
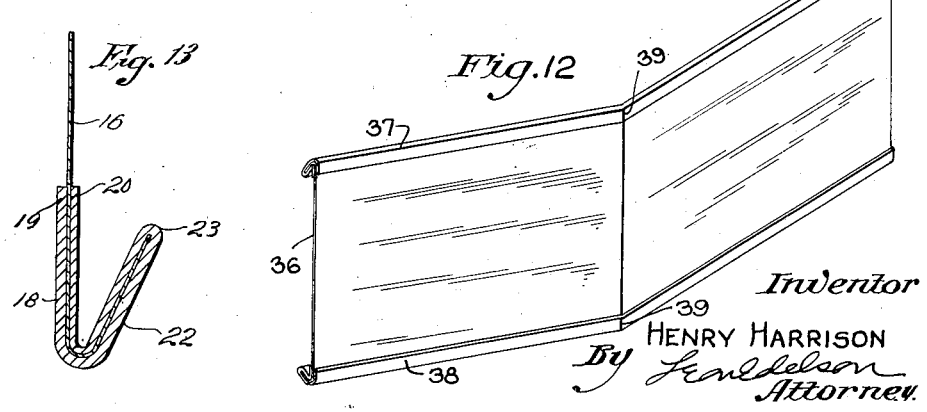
Inventor
HENRY HARRISON
By Leo Idelson
Attorney.

Patented Apr. 20, 1937

2,077,690

UNITED STATES PATENT OFFICE 2,077,690

DISPLAY DEVICE

Henry Harrison, Conshohocken, Pa.

Application December 4, 1934, Serial No. 755,864

5 Claims. (Cl. 40—125)

This invention relates generally to display devices for use particularly in connection with vehicle tires, advertising poster frames and all other such structures as are characterized by the provision of a central opening which is adapted to be spanned by an advertising poster and through which may be viewed the printed matter appearing on the poster.

In my co-pending application, Serial No. 691,341 filed September 28, 1933, there is disclosed the use of a flexible poster in association with a pneumatic tire casing, the poster being maintained in taut condition within the tire casing in such manner as to present to view through the opening in the casing when the latter is viewed broadside the display matter appearing upon the poster. The particular tensioning means disclosed in said application for sustaining the flexible casing in its required taut condition is peculiarly adapted to tire casings and it has been found that some adjustment is required to adapt the same means for use in connection with tire casings of different sizes. Moreover, it has been found that while a poster of given size may be satisfactorily held in taut condition by the said tensioning means in a tire casing of one size or type, the same poster could not well be employed in a tire casing of a materially different size or type, nor were the said tensioning means generally adapted to operatively retain the advertising poster within structures other than vehicle tires.

It is apparent, of course, that there are available many structures other than tire casings in connection with which advertising posters of the character shown in my said co-pending application may be employed. These structures may depart radically in shape from that of a tire casing and yet may be provided with openings which are adapted to be spanned by an advertising poster stretched across the opening, and it is among the principal objects of this invention to provide a simple and inexpensive tensioning means for sustaining in operative position across such opening a normally limp advertising or other such display poster.

A further object of the present invention is to provide tensioning means for the flexible poster which operates not only to maintain the latter in suitably taut condition across the opening to be spanned regardless of the external shape or configuration or of the overall dimension of the structure within which the poster is to be displayed but also to position the poster so that its front surface seats firmly against the marginal edge of the opening through which the display matter appearing on the poster is to be viewed. By thus effecting an intimate contacting engagement between the poster and the marginal edge of the opening, the arrangement lends itself admirably to illumination of the poster, as when the latter is made of transparent or translucent material and is subjected to the rays of a light source located to the rear of the poster.

With the foregoing and other objects in view, the present invention consists substantially in the combination, construction, location and relative arrangement of parts, all as will appear more fully hereinafter, as shown in the accompanying drawings and as finally pointed out in the appended claims. In the said accompanying drawings:—

Figure 1 is an elevational broadside view of a conventional tire showing operatively mounted therein, in accordance with the present invention, a display poster formed of normally limp material;

Figure 2 is a diametral sectional view of the tire showing the poster partially inserted in position therewithin;

Figure 3 is a view corresponding to that of Figure 2 but showing the poster in its fully extended condition and operatively positioned within the tire;

Figure 4 is an enlarged view of the upper section of Figure 3;

Figure 5 is a perspective view showing another type of supporting structure for the display poster;

Figure 6 is a front elevational view of the structure shown in Figure 5;

Figure 7 is a vertical sectional view of the said structure;

Figure 8 is an enlarged view showing a preferred construction of the anchoring extremity of the tensioning member for the poster;

Figures 9 and 10 are side and front elevational views, respectively, showing the poster unit of the present invention supported within another type of holder therefor;

Figure 11 is a front elevational view of a slightly modified form of poster unit arranged to be self-sustaining;

Figure 12 is a perspective view showing the unit of Figure 11 expanded into self-sustaining condition and Fig. 13 is an enlarged sectional view of one of the metal edge members of the present invention.

Referring now more particularly to the drawings, Figures 1 to 4 thereof illustrate the application of the present invention to a vehicle tire of conventional form, while Figures 5 to 7 thereof illustrate its application to an entirely different type of structure. In the first of these arrangements, the tire casing, designated generally by the reference numeral 10, is of the conventional form having the usual tread 11 and the side walls respectively terminating in the beads, the said annular beads being disposed in substantially parallel planes spaced apart a distance sufficient to accommodate therebetween a flexible poster 14. It is among the purposes of this invention to provide an arrangement for supporting the said poster in taut condition between the laterally spaced beads 13—13 of the tire casing whereby to present to view through the central opening 15 of the tire casing the printed or other display matter appearing upon the poster.

The poster 14, as constructed in accordance with and for the purposes of the present invention, essentially comprises a substantially rectangular sheet 16 of paper, cloth or other such limp material, one or both surfaces of which is adapted to have printed or painted thereon, or otherwise applied thereto, any desired advertising or display material. Secured respectively to the upper and lower edges of the flexible sheet 16 are a pair of longitudinally extending edge strips 17 and 18, these strips being preferably constructed of metal and being each folded upon themselves to provide a pair of contiguous flanges 19 and 20 between which is adapted to be clamped the horizontally extending marginal edge of the sheet 16. After the upper and lower edges of the flexible sheet are thus respectively clamped between the flanges 19 and 20 of each edge strip, each of the latter is again folded upon itself to provide a branch forming an acute angle with the plane of the sheet 11 when the latter is in its expanded condition. As is most clearly shown in Figure 3, the angularly extending branch thus formed in the upper edge strip 17 is designated by reference numeral 21, while the corresponding branch formed in the bottom edge strip 18 is designated by the reference numeral 22, it being further observed in this figure that the said branches 21 and 22 present toward each other in such manner as to provide in effect along the upper and lower edges of the flexible sheet a pair of channels the mouths of which present toward each other. The fact that the opposite horizontal edges of the flexible material extend to the bight 23 of each of the edge strips 17 and 18 and are thus folded upon themselves together with the edge strips provides for a very secure and withal simple joint between the said edge strips and the marginal edges of the sheet to which said strips are secured.

The provision of this type of edge strip along the upper and lower edges of the flexible sheet 16 makes it possible to employ one or more tensioning members of the form shown more particularly in Figures 3 and 4 for maintaining the sheet in taut condition. These tensioning members, which are designated generally in Figures 1 to 4 by the reference numeral 24, are in the form of transversely flexible rods the opposite ends of which are directed laterally, as at 25, and thence longitudinally and outwardly, as at 26, to provide anchoring extremities which are adapted to be readily accommodated within the channels formed within the edge strips 17 and 18. Preferably, the rod or rods 24 are of an overall length somewhat greater than the overall length of the sheet 16 so that when the opposite extremities 26—26 thereof are respectively seated within the channels of the edge members 17 and 18, the said rod or rods are under sufficient tension to adequately maintain the sheet 16 in taut condition.

Reverting again to the particular arrangement shown in Figures 1 to 4, inclusive, it will be observed that the tension rods 24 serve a two-fold function. First, to maintain the sheet 16 in stretched condition, and second, to frictionally retain the tautened sheet within the tire and between the laterally spaced beads 13—13 thereof so that the sheet spans the central opening 15 of the tire casing and so presents to view through said opening the display matter appearing upon the sheet. As appears most clearly in Figures 3 and 4, this latter function is accomplished by reason of the bowed condition of the rod or rods 24, it being observed that the bowed portion of the rod projects rearwardly from the plane of the poster sheet and so engages the rear bead of the tire casing as to urge the front surface of the poster into intimate contacting engagement with the front bead of the tire casing.

It will be understood, of course, that when the tensioning member 24 is removed from its operative engagement with the edge members 17 and 18 of the poster sheet, the latter is adapted to be readily removed from its position within the tire casing by the simple expedient of rolling the poster upon itself and then shifting it laterally to an extent sufficient to permit the roll to be readily removed through the opening 15 of the tire casing, this operation being reversed when it is desired to insert the poster operatively within the tire casing.

The adaptability of this type of poster to structures other than vehicle tires is well illustrated by the arrangement shown in Figures 5 to 7 wherein it will be observed the poster is operatively mounted within a polygonally shaped frame 27 having a central opening 28 in the front panel thereof. This frame 27 is provided at its top and bottom edges with oppositely facing channels within which are adapted to be respectively seated the upper and lower edge strips 17 and 18 of the poster sheet, the tensioning means 24 being again employed to maintain the sheet in adequately stretched condition across the central opening 28 in the frame. In this latter arrangement as well as in the tire casing arrangement previously described, it will be noted that the tensioning members 24 serve their intended function of maintaining the flexible sheet 16 in stretched condition without any aid whatsoever from the structure within which the poster sheet is mounted, and it will be furthermore noted that the said tensioning means are not visible to a person viewing the printed matter displayed upon the poster.

In Figure 8 is shown a tensioning rod 24a the anchoring extremity 29 of which is of flattened form and provided with a relatively wide edge 30. Both anchoring extremities of the tensioning member may be similarly formed and it will be apparent that when such a construction is employed the relatively wide edges 30 of the anchoring extremities afford a more positive seat for the tensioning member 24a and so prevents to a great extent, if not entirely, any tendency for the tensioning rod to skew out of its proper tensioning position between the edge members 17 and 18 of the poster.

The construction of the poster sheet, as previously described, particularly as respects the formation of its edge members 17 and 18, renders it adaptable to many uses other than those illustrated in Figures 1 and 5. Moreover, by reason of these channel-shaped edge members, one is not limited to the use of tensioning members of the type shown in Figures 1 to 8 but may instead employ for such purposes laterally flexible flat strips, the opposite ends of which are respectively adapted for reception within the opposed channels of the members 17 and 18. This latter type of tensioning member is shown in Figures 9 and 10, being designated therein by the numeral 31. Although Figures 9 and 10 show the use of a single tensioning member 31, it will be understood that two or more such members may be employed in laterally spaced relation to maintain the flexible sheet 16 in its taut condition.

When the flat type of tensioning member 31 is employed, the display poster may be readily supported in position in a holder 32 of the type more particularly disclosed in my co-pending application Serial No. 691,341, filed September 28, 1933 and which comprises a pair of plates 33—33 suitably interconnected by a pair of yielding connecting straps 34—34, each of which is centrally depressed, as at 35, to provide a pair of alined seats for receiving the lower edge of the display poster, it being understood that the upper edges of the plates 33 are normally urged inwardly and toward each other to clampingly engage the display poster. Due to the channel-shaped edge members 17 and 18 initially provided along the upper and lower edges of the flexible poster sheet, it becomes possible to employ the substantially flat tensioning members 31 for maintaining the sheet in taut condition, and the use of these latter members in turn makes it possible to employ the holder 32 as shown in Figures 9 and 10. Obviously, the display poster, when tensioned by the tensioning rods of the type shown in Figures 1 to 8, could not well be supported within the holder 32, yet by the simple expedient of substituting the flat bars 31 for the tensioning rods 24 the same poster may be employed in conjunction with the holder 32.

Figures 11 to 12 illustrate still another advantageous use of the channel-shaped edge strips for the upper and lower edges of the flexible poster sheet. In the arrangement shown in these latter figures, the normally limp sheet material 36 is of rectangular form and is provided along its opposite edges with metal strips 37 and 38 of the same form and applied in the same manner as the members 17 and 18 of the previously described poster. They differ from the latter members only in the fact that they are each intermediately scored, as at 39, to thereby facilitate so bending each of the members 37 and 38 as to provide a pair of angularly related poster sections 40 and 41. By individually providing each of these latter sections with one or more tensioning members 42, the poster is rigidified and rendered self-sustaining to such extent as to require no collateral supporting devices of any kind whatsoever. Upon removal of the tensioning members 42 and straightening the edge strips 37 and 38, the poster sheet may be rolled up to thereby provide an exceedingly compact unit which is especially suitable for shipping and storage purposes.

It will be apparent, of course, that the flexible sheet of material when provided with the channel-shaped edge members and tensioned as above described is adaptable not only for display advertising but also to various other uses. as for instance, motion picture projection screens. And when said sheet is formed of a transparent or translucent faterial and in tensioned condition is mounted within a tire casing or frame in the manner shown in Figures 1 and 5, its visible area is particularly adapted to be illuminated by a light source suitably located rearwardly thereof, the intimate engagement obtained between the front surface of the tensioned sheet and the marginal edge of the sight opening in the supporting structure serving effectively to prevent the projection of any unintercepted light rays across the front surface of the sheet such as would detract from the desired direct illumination of the display matter.

It will be understood, of course, that the invention is susceptible of various changes from time to time without departing from the real spirit or general principles thereof and it is accordingly intended to claim the same broadly, as well as specifically, as indicated by the appended claims.

What is claimed as new and useful is:—

1. The combination of a tire casing, with a flexible poster sheet inserted within the space formed between the inner proximate surfaces of the opposed beads of the tire casing, said sheet being provided along opposed edges thereof with channel-shaped metal edge members, and a tensioning member in the form of a resilient rod the opposite extremities of which are respectively adapted to be accommodated within the channel-shaped edge members of the sheet whereby to tension and so maintain the latter in taut condition, the said tensioning member being fashioned to so coact with one body of the tire casing as to cause the tensioned sheet to engage flatwise against the opposite body of the tire.

2. The combination of a tire casing, with a flexible poster sheet inserted within the space formed between the inner proximate surfaces of the opposed beads of the tire casing, said sheet being provided along opposed edges thereof with channel-shaped metal edge members, and a tensioning member in the form of a resilient rod the opposite extremities of which are respectively adapted to be accommodated within the channel-shaped edge members of the sheet whereby to tension and so maintain the latter in taut condition, the said extremities of the tensioning member being laterally offset relatively to the main body thereof so that the latter bears against diametrically opposed points in one of the beads of the tire casing and so causes the tensioned sheet to engage flatwise against the opposite one of said beads.

3. A display device comprising in combination with a flexible sheet a metal member folded upon itself to provide parallel portions of substantially equal depth between which the marginal edge of said flexible sheet is clampingly secured, said parallel portions of the metal member and the marginal edge of the sheet clamped therebetween being bent to provide a metal-lined channel one wall of which is disposed substantially in the flattened plane of said sheet and the other wall thereof extending angularly with respect to said plane.

4. The combination of a tire casing with a flexible poster sheet inserted within the space formed between the inner proximate surfaces of the opposed beads of the tire casing, said sheet being provided along opposed edges thereof with channel shaped metal edge members, and a tensioning member in the form of a resilient bar, the opposite extremities of which are respectively adapted to be accommodated within the channel shaped edge members of the sheet whereby to tension and so maintain the latter in taut condition, said tensioning member being provided with means engageable with one bead of the tire casing to press the tension sheet flatwise against the opposite bead of the tire casing.

5. The combination of a tire casing with a flexible poster sheet inserted within the space formed between the inner proximate surfaces of the opposed beads of the tire casing, said sheet being provided along opposed edges thereof with channel shaped metal edge members and a tensioning member in the form of a resilient bar, the opposite extremities of which are respectively adapted to be accommodated within the channel shaped edge members of the sheet whereby to tension and so maintain the latter in taut condition, the said extremities of the tensioning member being respectively provided with laterally offset means engageable against diametrically opposed points in one of the beads of the tire casing to cause the tension sheet to engage flatwise against the opposite one of said beads.

HENRY HARRISON.